United States Patent
Igarashi et al.

(10) Patent No.: US 7,737,615 B2
(45) Date of Patent: Jun. 15, 2010

(54) LIGHT EMITTING COMPOSITION, LIGHT SOURCE DEVICE, AND DISPLAY DEVICE

(75) Inventors: Takahiro Igarashi, Kanagawa (JP); Tsuneo Kusunoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 457 days.

(21) Appl. No.: 11/743,431

(22) Filed: May 2, 2007

(65) Prior Publication Data

US 2007/0267965 A1 Nov. 22, 2007

(30) Foreign Application Priority Data

May 16, 2006 (JP) ............................. 2006-136921

(51) Int. Cl.
*H01J 1/62* (2006.01)
*H01J 63/04* (2006.01)

(52) U.S. Cl. ................... 313/483; 313/502; 313/582; 313/489; 428/403; 349/70

(58) Field of Classification Search ............ 313/48, 313/498, 496, 110, 486, 489, 502, 503, 509, 313/582, 483; 257/98; 252/500, 301.4 R, 252/301.4 S; 428/403, 404, 690; 362/84; 349/70, 71

See application file for complete search history.

(56) References Cited

U.S. PATENT DOCUMENTS

| | | | | |
|---|---|---|---|---|
| 7,332,746 B1 * | 2/2008 | Takahashi et al. | ............. | 257/98 |
| 2002/0039665 A1 | 4/2002 | Do et al. | | |
| 2002/0070449 A1 * | 6/2002 | Yagi et al. | .................... | 257/734 |
| 2002/0105266 A1 | 8/2002 | Juestel et al. | | |
| 2002/0113921 A1 * | 8/2002 | Jiang et al. | ..................... | 349/96 |
| 2004/0061433 A1 * | 4/2004 | Izuno et al. | ................. | 313/498 |
| 2004/0135504 A1 * | 7/2004 | Tamaki et al. | ............... | 313/512 |
| 2004/0166320 A1 | 8/2004 | Kobusch | | |
| 2005/0001225 A1 * | 1/2005 | Yoshimura et al. | ............ | 257/98 |
| 2006/0082296 A1 * | 4/2006 | Chua et al. | ................... | 313/512 |

FOREIGN PATENT DOCUMENTS

| | | |
|---|---|---|
| GB | 2291734 | 1/1996 |
| JP | 2924279 | 5/1999 |
| JP | 2004-505172 | 2/2004 |
| JP | 2004/097949 | 11/2004 |
| JP | 2006-052354 | 2/2006 |

* cited by examiner

*Primary Examiner*—Peter J Macchiarolo
*Assistant Examiner*—Glenn Zimmerman
(74) *Attorney, Agent, or Firm*—K&L Gates LLP

(57) ABSTRACT

A light emitting composition, light source device, and display device are provided. The light emitting composition has a phosphor, including a glass layer containing at least silicon (Si) and oxygen (O) formed on the surface of the phosphor. Exposed regions of the phosphor are made discrete by the glass layer.

11 Claims, 6 Drawing Sheets

LIGHT EMITTING COMPOSITION, LIGHT SOURCE DEVICE, AND DISPLAY DEVICE

CROSS REFERENCES TO RELATED APPLICATIONS

The present application claims priority to Japanese Patent Application JP 2006-136921 filed in the Japan Patent Office on May 16, 2006, the entire contents of which being incorporated herein by reference.

BACKGROUND

The present application relates to a light emitting composition having a phosphor, a light source device having such a light emitting composition, and a display device having such a light source device.

A phosphor has a feature such that the wavelength band of light emitted from the phosphor changes according to the kind or composition of the components of the phosphor. Accordingly, the phosphor has received attention as a light emitting material in which a desired wavelength band of emitted light can be selected from a wide wavelength range.

On the other hand, it is expected to apply the phosphor having such a feature to a thin display device called an FPD (flat panel display) such as a liquid crystal display, plasma display, and organic EL (electroluminescence) display.

Since a light emitting configuration for obtaining white light by the combination of a YAG:Ce phosphor to be excited by blue light and an LED (Light Emitting Diode) as a blue light source was proposed (see Japanese Patent No. 2927279, for example), the above attention and expectation have been increasing on a phosphor to be excited by blue light.

Such a light emitting configuration obtained by the combination of a phosphor to be excited by blue light and a blue light source has been considered to be suitable for a light source device adapted to be used in a display device (e.g., a backlight used in a liquid crystal display) (see JP-A-2004-505172, for example).

According to this light emitting configuration, a drive circuit can be simplified as compared with a configuration such that all of the blue, green, and red colors are obtained by direct drive type light sources such as LEDs. Further, according to this light emitting configuration, a deterioration of peripheral members (resin members, LED chips, etc.) can be suppressed as compared with a configuration using near-ultraviolet light as excitation light. Owing to these advantages, the combination of a blue light source and a phosphor is considered to be suitable for a light source device in a display device.

However, most of phosphors to be excited by blue light have a disadvantage such that the moisture resistance is low and the characteristics are therefore deteriorated by the moisture contained in the air (atmosphere).

In general, a light source device is difficult to clear a reliability test under the conditions of ordinary temperature and ordinary humidity and is difficult to additionally clear a reliability test under more stringent conditions (e.g., a temperature of 40° C. or more and a humidity of 90% RH (relative humidity) or more). However, since the phosphor to be excited by blue light has low moisture resistance, the above severe reliability test is difficult to be cleared. For example, in the case that an alkaline earth metal sulfide (CaS:Eu) as the phosphor described in JP-A-2004-505172 is mixed with epoxy resin and a blue LED is potted with this mixture to perform a reliability test under the conditions of 45° C. and 95% RH, the emitted light intensity decreases by about 60% after 173 hours as shown in FIG. 5. This result is insufficient as long-term reliability of products.

To solve this problem on the moisture resistance of the phosphor, it has been proposed to deposit glass on the surface of the phosphor, thereby improving the moisture resistance (see Japanese Patent Laid-open No. 2006-52354, for example).

However, the present inventors have found that the deposition of glass is difficult to improve the moisture resistance of the phosphor. More specifically, the present inventors have found that the influence of the deposition of glass on the phosphor changes according to the condition and degree of the deposition and that the moisture resistance is possibly reduced when the amount of deposited glass is small (e.g., glass is discretely deposited on the surface of the phosphor).

The present inventors have performed an environmental test under the conditions of 25° C. and 75% RH by using a phosphor on which glass is discretely deposited.

As the test result, although the test conditions are less stringent than those of the reliability test mentioned above with reference to FIG. 5, it was determined that the emitted light intensity of the phosphor is reduced with time irrespective of whether or not the deposited glass is present as shown in FIG. 6. Further, as apparent from FIG. 6, the rate of deterioration of the phosphor is higher in a sample having the deposited glass (broken line y) than in a sample having no deposited glass (solid line x).

SUMMARY

It is desirable to provide a light emitting composition having a phosphor which can be improved in moisture resistance. It is desirable to provide a light source device having such a light emitting composition. It is desirable to provide a display device having such a light source device.

According to an embodiment, a light emitting composition has a phosphor. The surface of the phosphor is coated with a glass layer containing at least silicon (Si) and oxygen (O), and exposed regions of the phosphor are made discrete by the glass layer.

According to another embodiment, a light source device has a first light emitting composition, a second light emitting composition, and a blue light source. At least one of the first light emitting composition and the second light emitting composition has a phosphor to be excited by blue light emitted from the blue light source; and the surface of the phosphor is coated with a glass layer containing at least silicon (Si) and oxygen (O), exposed regions of the phosphor being made discrete by the glass layer.

According to a further embodiment, a display device includes a light source device having a first light emitting composition, a second light emitting composition, and a blue light source; and an optical device for performing predetermined modulation to light emitted from the light source device to thereby output predetermined light. At least one of the first light emitting composition and the second light emitting composition has a phosphor to be excited by blue light emitted from the blue light source. The surface of the phosphor is coated with a glass layer containing at least silicon (Si) and oxygen (O), exposed regions of the phosphor being made discrete by the glass layer.

According to the light emitting composition of an embodiment, the exposed regions of the phosphor are made discrete by the glass layer formed on the surface of the phosphor. Accordingly, deterioration in characteristics of the phosphor can be suppressed.

According to the light source device of the embodiment of an embodiment, at least one of the first light emitting composition and the second light emitting composition has a phosphor to be excited by blue light emitted from the blue light source, and the surface of the phosphor is coated with a glass layer containing at least silicon (Si) and oxygen (O). Further, exposed regions of the phosphor are made discrete by the glass layer. Accordingly, deterioration in characteristics of the light source device can be suppressed.

According to the display device of an embodiment, at least one of the first light emitting composition and the second light emitting composition has a phosphor to be excited by blue light emitted from the blue light source, and the surface of the phosphor is coated with a glass layer containing at least silicon (Si) and oxygen (O). Further, exposed regions of the phosphor are made discrete by the glass layer. Accordingly, deterioration in characteristics of the light source device can be suppressed.

Additional features and advantages are described herein, and will be apparent from, the following Detailed Description and the figures.

DETAILED DESCRIPTION

The present application will now be described with reference to the drawings according to an embodiment.

A light emitting composition according to an embodiment is applied to a light source device (e.g., backlight device) in a display device (e.g., liquid crystal display).

Figure 1:
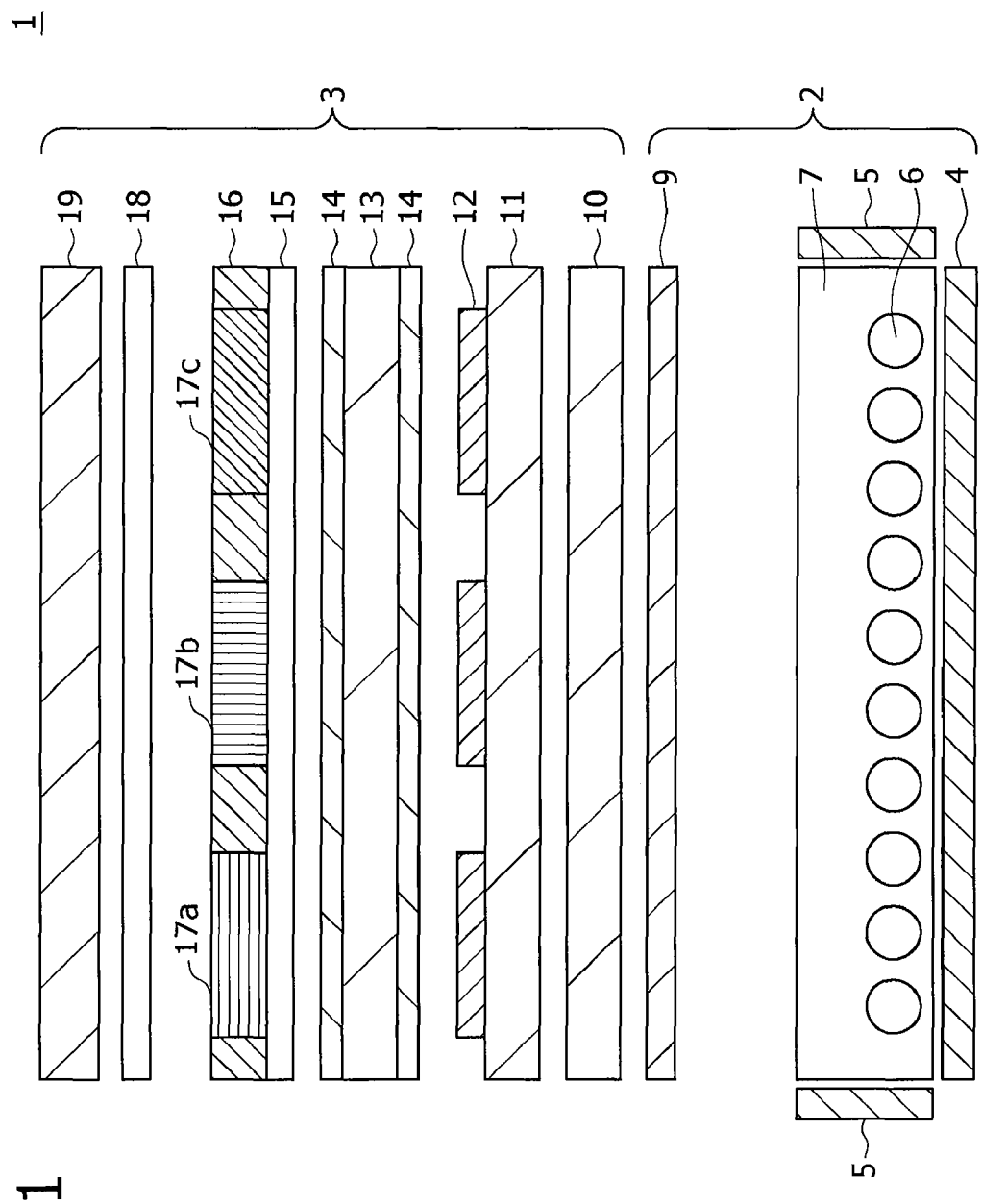
FIG. 1 is a schematic sectional view of a display device according to an embodiment including a light source device according to an embodiment.

FIG. 1 is a schematic sectional view showing the configuration of a display device 1 having a light source device 2. The display device 1 has the light source device 2 and an optical device 3.

The light source device 2 is a backlight device for the optical device 3 provided by a liquid crystal device.

The light source device 2 includes a light guiding portion 7 formed of resin and a plurality of light emitting elements 6 provided in the light guiding portion 7. Each light emitting element 6 is composed of a blue light source provided by a blue LED, for example, and a resin coating formed on the surface of the blue light source. The resin coating contains many phosphors.

The light source device 2 further includes a diffusion sheet 9 located nearest to the optical device 3 so as to be opposed thereto. The diffusion sheet 9 functions to two-dimensionally uniformly guide the light emitted from the light emitting elements 6 to the optical device 3. The light source device 2 further includes a reflector 4 provided on the back side of the light guiding portion 7. Further, as necessary, reflectors 5 similar to the reflector 4 are provided on the peripheral sides of the light guiding portion 7.

In the light source device 2, the resin forming the light guiding portion 7 may be selected from various transparent resins such as epoxy resin, silicone resin, and urethane resin. Further, the blue light source constituting each light emitting element 6 may be selected from various types such as a side emitter type and a bullet type.

The optical device 3 is provided by a liquid crystal device for performing modulation to the light emitted from the light source device 2 to thereby output predetermined light.

The optical device 3 includes a polarizer 10, a glass substrate 11 for TFTs (Thin Film Transistors), a plurality of dot electrodes 12 formed on the upper surface of the glass substrate 11, and a liquid crystal portion composed of a liquid crystal layer 13 and a pair of alignment layers 14 formed on both surfaces 3 of the liquid crystal layer 13. The optical device further includes an electrode 15, a black matrix 16 formed on the upper surface of the electrode 15, and a set of first (red) color filter 17a, second (green) color filter 17b, and third (blue) color filter 17c formed in the black matrix 16 so as to correspond to the pixels formed by the black matrix 16. The optical device 3 further includes a glass substrate 18 provided separately from the black matrix 16 and the color filters 17a to 17c, and a polarizer 19 provided on the upper surface of the glass substrate 18. These components 10 to 19 are arranged in this order from the lower side adjacent to the light source device 2.

The polarizers 10 and 19 function to form polarized light oscillating in a specific direction. The TFT glass substrate 11, the dot electrodes 12, and the electrode 15 are provided to switch the liquid crystal layer 13 capable of transmitting polarized light oscillating in a specific direction. The alignment layers 14 function to align the inclination of liquid crystal molecules present in the liquid crystal layer 13 in a given direction. The black matrix 16 functions to improve the contrast of light passing through the color filters 17a to 17c. The black matrix 16 and the color filters 17a to 17c are mounted to the glass substrate 18.

In the light source device 2 according to this preferred embodiment, the phosphors included in each light emitting element 6 are composed of first phosphors for emitting light in a green region (bluish green phosphors or green phosphors) and second phosphors for emitting light in a red region (yellow phosphors or red phosphors). Each particle of the first phosphors is coated with a glass layer containing at least silicon (Si) and oxygen (O).

In an embodiment, the first phosphors each having such a glass coating constitute a first light emitting composition as a first example of the light emitting composition according to an embodiment. An example of the first phosphors to be excited by blue light may include $SrGa_2S_4:Eu$.

Similarly, each particle of the second phosphors is coated with a glass layer containing at least silicon (Si) and oxygen (O). In this preferred embodiment, the second phosphors each having such a glass coating constitute a second light emitting composition as a second example of the light emitting composition according to an embodiment. Examples of the second phosphors to be excited by blue light may include CaS:Eu and SrS:Eu as a solid solution of $Eu^{2+}$ in an alkaline earth metal sulfide.

With this configuration, the white chromaticity in the whole of the light source device 2 is determined by the blue light sources, the first phosphors, and the second phosphors, and light corresponding to a target color can be output.

The relation between the glass layer and each phosphor common to the first and second light emitting compositions in this preferred embodiment will now be described with reference to FIG. 2A.

Figure 2A:
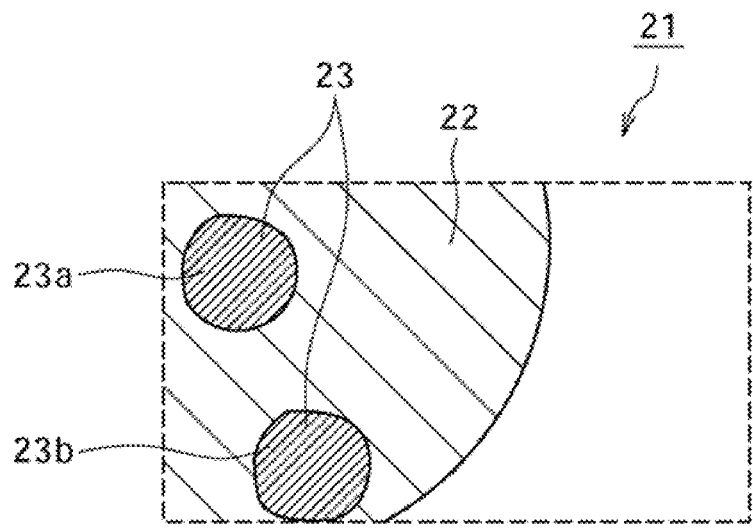
FIG. 2A is a schematic enlarged view of a part of a light emitting composition according to an embodiment.

FIG. 2A is a schematic enlarged view of a part of a light emitting composition 21 according to this preferred embodiment. As shown in FIG. 2A, the light emitting composition 21 includes a phosphor 23 and a glass layer 22 formed on the surface of the phosphor 23, and the phosphor 23 is exposed at regions 23a and 23b from the glass layer 22. The exposed regions 23a and 23b are discrete from each other. In this manner, the glass layer 22 is continuously formed on the surface of the phosphor 23, so that the area of contact between the phosphor 23 and the moisture in the air can be sufficiently reduced. Accordingly, the moisture resistance of the phosphor 23 can be improved with this configuration.

Further, the glass layer 22 is formed so as to surround the exposed regions 23a and 23b of the phosphor 23.

In other words, the glass layer 22 has an area sufficiently larger than that of the exposed regions 23a and 23b of the phosphor 23. Accordingly, the influence of the moisture adsorbed by the glass layer 22 to the phosphor 23 can be reduced, thereby more reliably improving the moisture resistance of the phosphor 23.

Figure 2B:
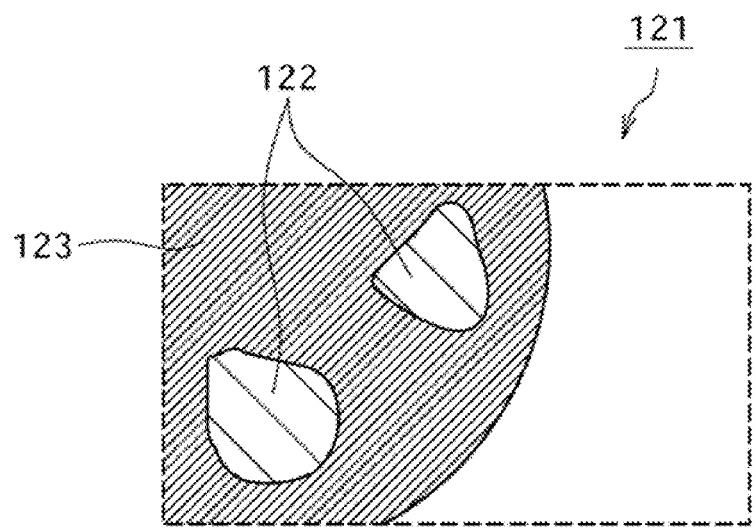
FIG. 2B is a view similar to FIG. 2A, showing a light emitting composition in related art.

FIG. 2B is a view similar to FIG. 2A, showing a light emitting composition 121 in related art. In the light emitting composition 121, glass particles 122 are deposited on the surface of a phosphor 123. However, the glass particles 122 deposited on the surface of the phosphor 123 is insufficient in amount, so that the glass particles 122 are not formed as a continuous layer. In this configuration, the glass particles 122 are deposited by laser ablation or the like in such a manner that the glass particles 122 are discretely present on the surface of the phosphor 123 so as to be surrounded by the exposed portion of the phosphor 123 as conversely to the configuration of the light emitting composition 21 shown in FIG. 2A. Accordingly, there is a possibility that the moisture resistance of the light emitting composition 121 in the related art shown in FIG. 2B may become low.

To the contrary, the light emitting composition 21 shown in FIG. 2A according to this preferred embodiment can eliminate the above possibility in the light emitting composition 121 in related art.

That is, the light emitting composition according to this preferred embodiment is improved in moisture resistance to attain high long-term reliability.

A process for preparing the light emitting composition according to this preferred embodiment will now be described.

The light emitting composition according to this preferred embodiment may be prepared by a sol-gel process in the following manner.

First, 2 g of phosphor is dispersed in 50 ml of ethanol and heated to 70° C. Next, 1 ml to 100 ml of tetraethoxysilane (TEOS; $Si(OC_2H_5)_4$) is added and stirred.

Next, 1 ml to 40 ml of $H_2O$ for hydrolysis is added and stirred. Thereafter, the resultant mixture is heated with stirring for two hours.

Next, the mixture is filtered and the residue obtained by this filtering is dried at 50° C. to 200° C. for one hour to 48 hours.

Thus, a light emitting composition according to this preferred embodiment is obtained. The coating condition (the coating amount and thickness) of the glass layer on the phosphor is suitably adjusted by controlling the amount of TEOS. It is considered to be optimal that the proportion of $H_2O$ is four times the number of moles of TEOS, i.e., that TEOS is added in accordance with a stoichiometric ratio of glass.

EXAMPLE

An example will now be described according to an embodiment.

In this example, the light emitting composition according to the above preferred embodiment was prepared in the following manner and thereafter subjected to observation and a reliability test.

The light emitting composition was prepared by a sol-gel process as follows:

First, 2 g of CaS:Eu as the phosphor was dispersed in 50 ml of ethanol and heated to 70° C.

Next, 30 ml of TEOS was added and stirred.

Next, 9.6 ml of $H_2O$ for hydrolysis was added and stirred. Thereafter, the resultant mixture was heated with stirring for 2 hours.

Next, the mixture was filtered and the residue obtained by this filtering was dried at 50° C. to 200° C. for one hour to 48 hours.

Figure 3:
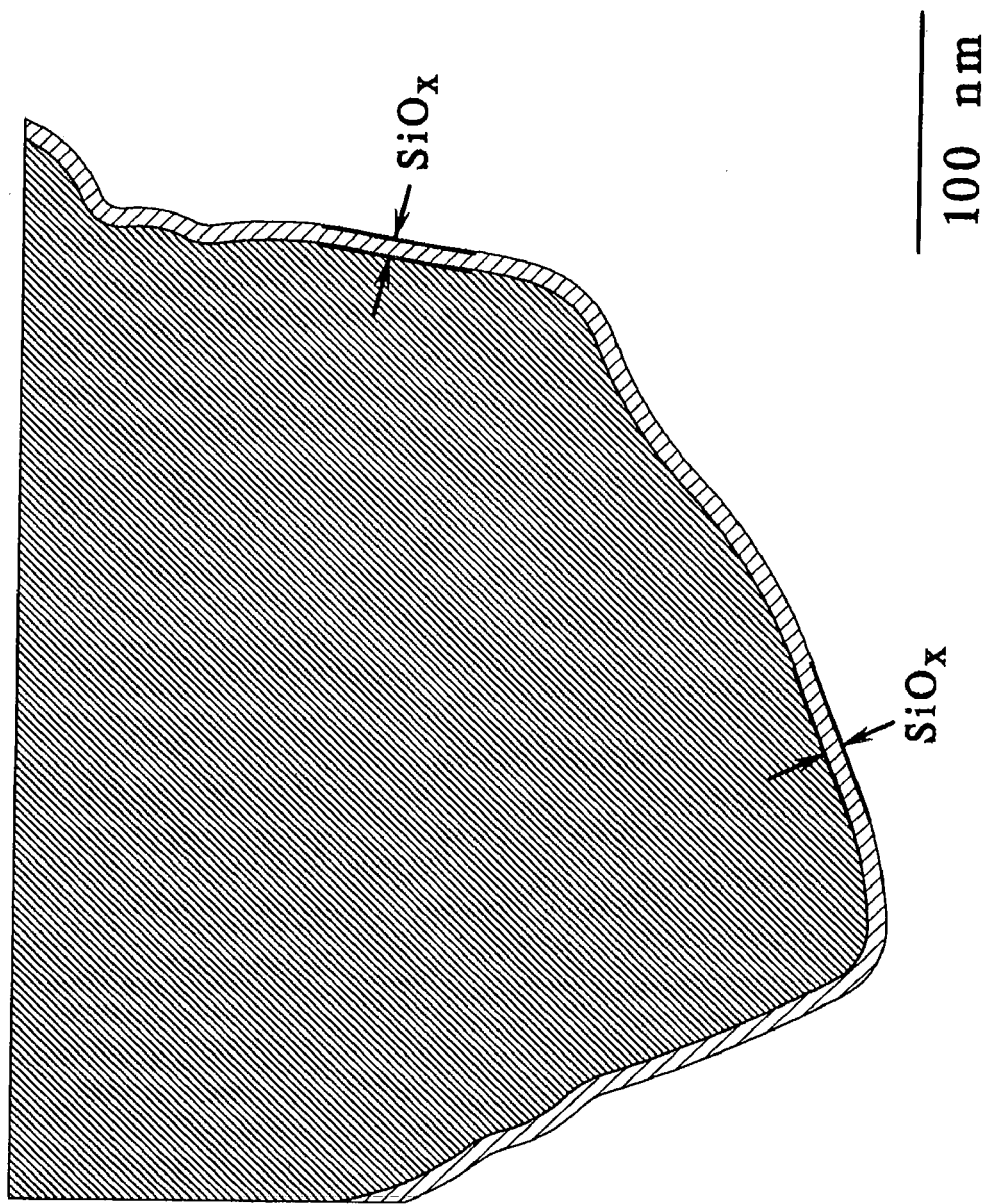
FIG. 3 is a photographic view of a section of the light emitting composition according to an embodiment by using a TEM.

FIG. 3 shows the result of observation (photograph of a section) of the resultant light emitting composition by using a TEM (Transmission Electron Microscope). As apparent from FIG. 3, a thin film having a substantially uniform thickness is formed on the surface of the phosphor (black portion in FIG. 3). This thin film was not observed on the phosphor before the above sol-gel process, so that this thin film was considered to be a glass layer containing silicon (Si) and oxygen (O) formed by the above sol-gel process.

This thin film was subjected to composition analysis by EDX (Energy Dispersive X-ray spectroscopy).

As the result of this analysis, Si and O were detected as elements, so that this thin film was determined as a glass layer of $SiO_x$ (mainly, $SiO_2$).

It was determined from the observation result shown in FIG. 3 that the light emitting composition in this example had a glass layer continuously formed on the surface of the phosphor.

Next, a reliability test was conducted under the conditions of 25° C. and 75% RH with the thickness of the glass layer varied. The test results are shown in FIG. 4.

In measuring the thickness of the glass layer, the phosphor or the light emitting composition was observed by TEM, and the thickness of the glass layer was measured at ten positions. The average of ten measured values for the thickness of the glass layer was adopted.

Figure 4:
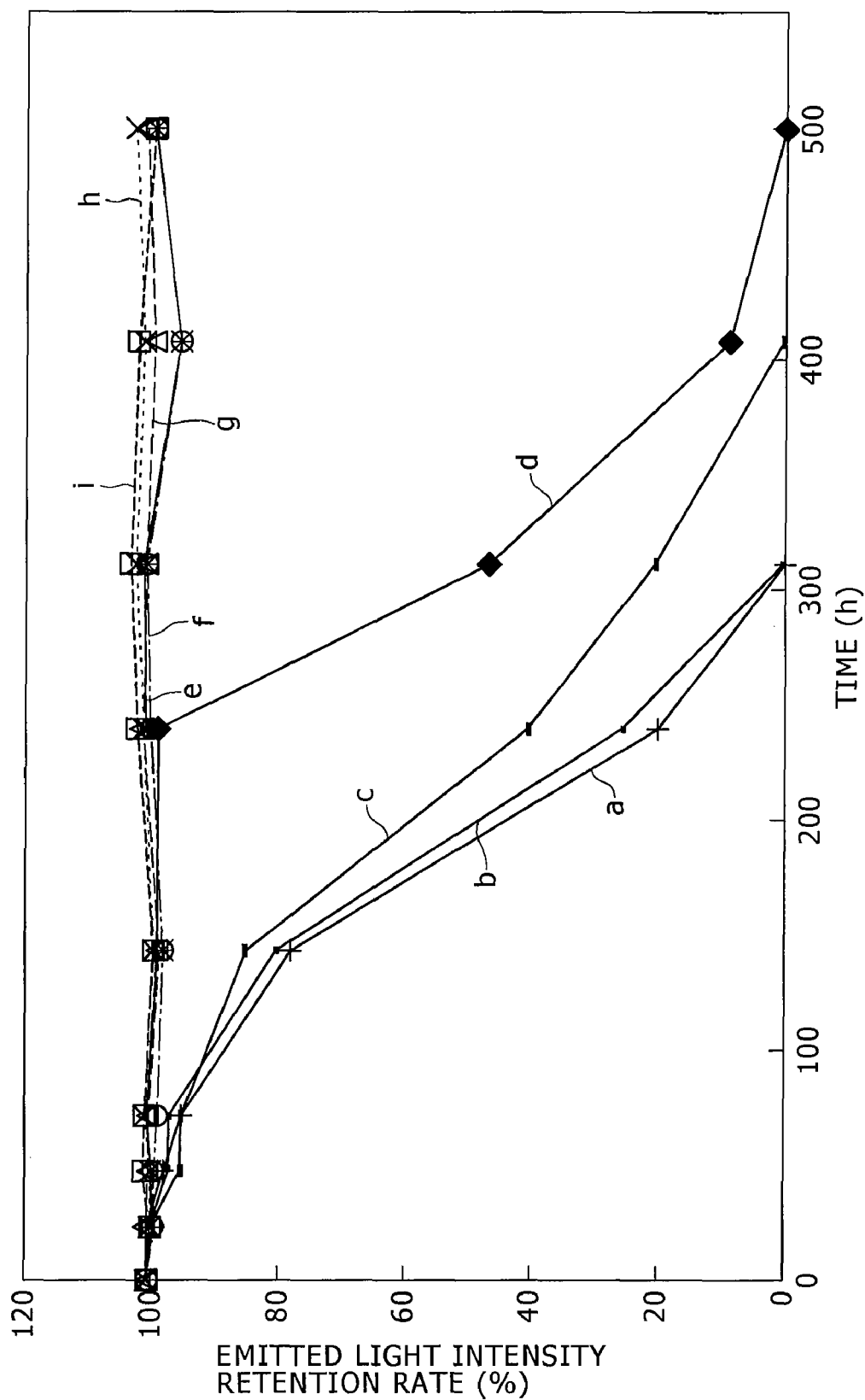
FIG. 4 is a graph showing the results of a reliability test conducted on the light emitting composition according to an embodiment.
Figure 5:
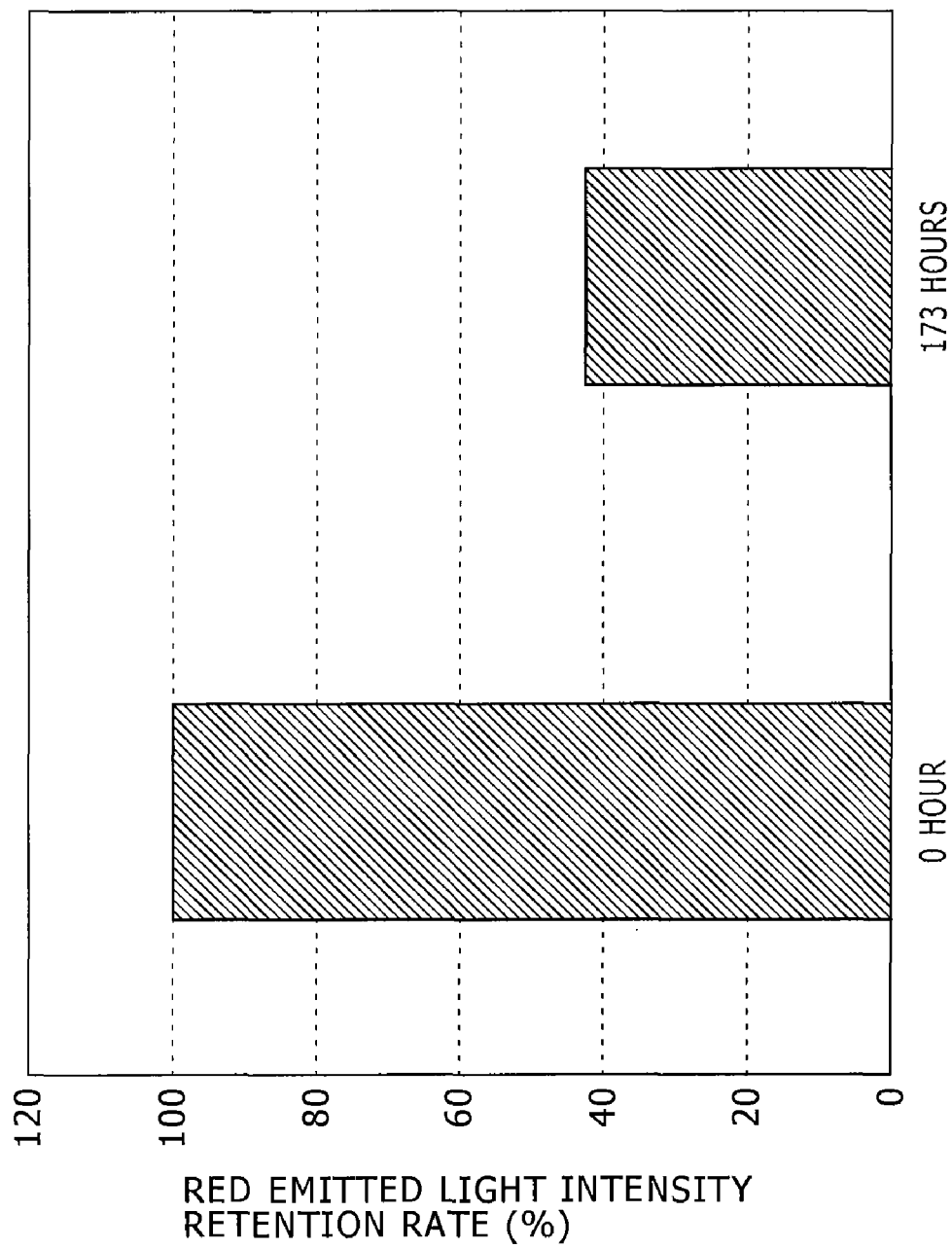
FIG. 5 is a graph for illustrating the problem of a light emitting composition in related art.
Figure 6:
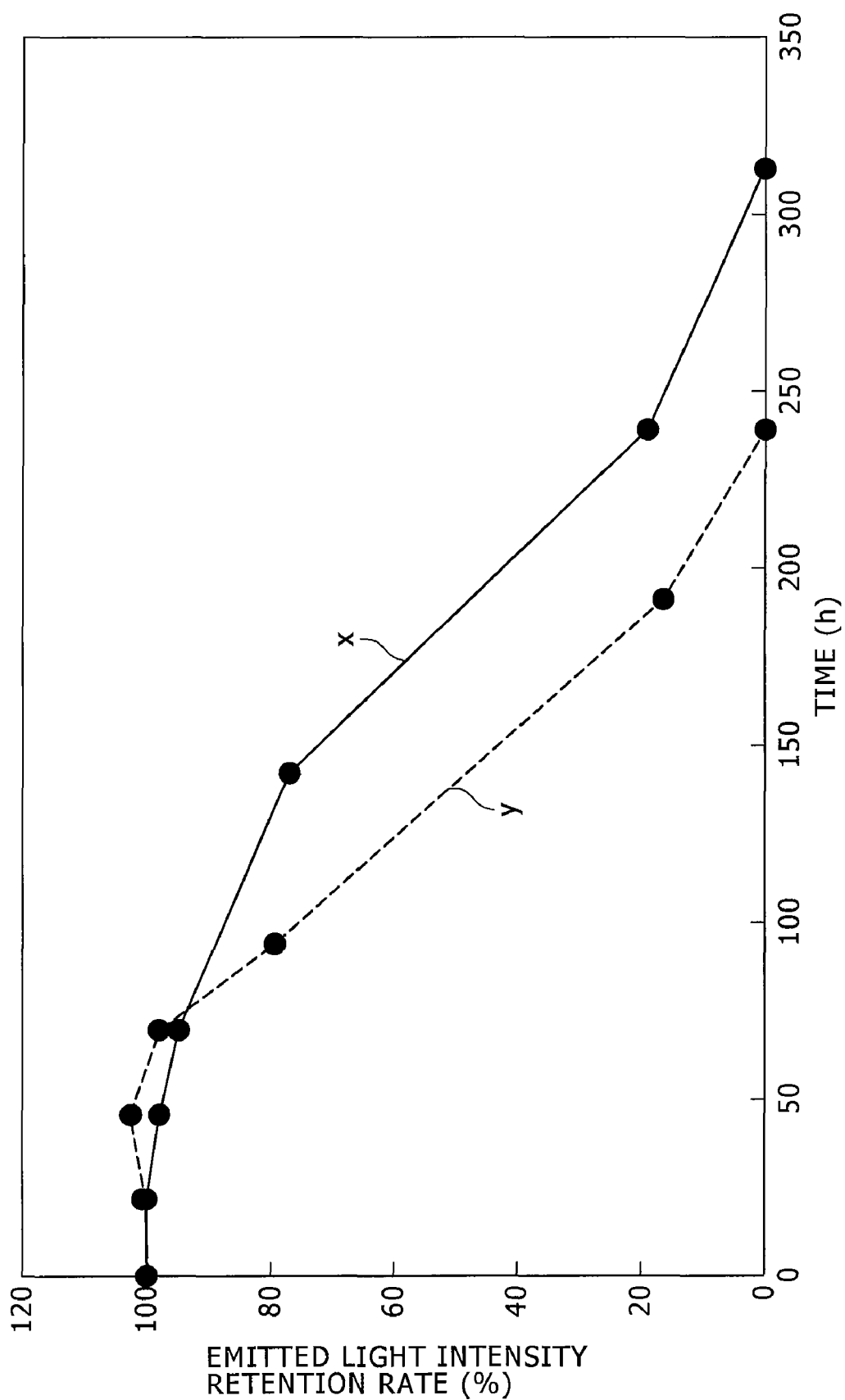
FIG. 6 is a graph showing the results of a reliability test conducted on a light emitting composition in related art.

It was determined that the results shown in FIG. 4 that as compared with the phosphor itself having no glass layer (symbol a), the light emitting composition having a glass layer formed on the surface of the phosphor (symbols b to i) has a tendency to improve the moisture resistance, thereby maintaining the emitted light intensity.

Further, the results shown in FIG. 4 show that as compared with the case that the thickness of the glass layer is 2.2 nm (symbol b), 5.1 nm (symbol c), or 11 nm (symbol d), the emitted light intensity can be maintained for 300 hours or more even under the conditions of high humidity in the case that the thickness of the glass layer is 21 nm (symbol e), 50 nm (symbol f), 72 nm (symbol g), 102 nm (symbol h), or 155 nm (symbol i).

As the result of more detailed investigation, it was determined that the emitted light intensity can be maintained for 300 hours or more when the thickness of the glass layer is 20 nm or more. The thickness of the glass layer is preferably set to a value less than or equal to the radius of each particle of the phosphor. If the thickness of the glass layer is greater than this value, it is considered that glass is solely precipitated and is not deposited on the surface of the phosphor. Although it is difficult to uniformly control the particle size of the phosphor, the particle size is preferably set to 500 μm or less, for example, even when it is relatively large.

Although not shown, it was determined that the moisture resistance can be improved by coating a glass layer on each of any other alkaline earth metal sulfides. In view of this result, it is considered that the improvement in moisture resistance can be expected by the coating of a continuous glass layer on any phosphor materials other than alkaline earth metal sulfides, that is, by adopting the configuration of the light emitting composition according to this preferred embodiment.

As described above, the light emitting composition according to this preferred embodiment has the configuration that the exposed regions of the phosphor are made discrete by the glass layer. In other words, the glass layer is continuously formed on the surface of the phosphor, thereby improving the moisture resistance.

Accordingly, the light source device including the light emitting composition improved in moisture resistance according to this preferred embodiment can ensure the reliability enough to clear the reliability test under the conditions of high temperature and high humidity.

It is considered that such a configuration of the light emitting composition that the exposed regions of the phosphor are made discrete by the glass layer can be easily formed by the sol-gel process (liquid-phase process) in particular. In the sol-gel process for preparation of the light emitting composition, an $SiO_x$ sol having high uniformity (little nonuniformity in thickness) is deposited on the entire surface of each particle of the phosphor, and this sol is next changed into a gel having high uniformity. Accordingly, it is considered that the glass layer is continuously and widely formed on the surface of the phosphor.

In the case of trying to form a glass layer on the surface of the phosphor by any other processes, for example, by a vapor-phase process such as sputtering, glass particles are deposited on the surface of the phosphor. Even if these glass particles are grown to be located adjacent to each other, there may be left many exposed regions of the phosphor that are difficult to be covered by the glass particles grown above. In such a configuration, the improvement in moisture resistance can be hardly expected and a grain boundary between the adjacent glass particles formed like secondary particles is considered to be left.

Accordingly, in the case that the glass layer is formed by the sol-gel process on the surface of the phosphor in the light emitting composition according to this preferred embodiment, the sol initially deposited in a liquid phase operates to continuously and widely cover the surface of the phosphor, so that the moisture resistance of the phosphor can be more reliably improved as compared with the case of growing glass particles.

In particular, by setting the thickness of the glass layer to 20 nm or more, the moisture resistance can be further improved. That is, by setting the thickness of the glass layer to a sufficiently large value, it is considered that a deterioration of the phosphor due to the penetration of water molecules into the glass layer can be suppressed.

That is, by continuously and widely forming the glass layer having a thickness of 20 nm or more on the surface of the phosphor, it is possible to attain long-term reliability higher than a predetermined standard such that no deterioration is observed even after the elapse of 500 hours, for example. Then, it is possible to obtain a light emitting composition having such higher long-term reliability.

A light source device includes such a light emitting composition, and a display device including such a light source device. While a preferred embodiment of the light emitting composition, the light source device, and the display device according to an embodiment has been described, it should be noted that the materials, the amounts thereof, and the numerical conditions including process time and size as employed in this preferred embodiment are merely illustrative and that the sizes, shapes, and positional relation illustrated in each drawing are also schematic. Thus, an embodiment is not limited to the above preferred embodiment.

For example, while TEOS suitable for use in the sol-gel process and relatively inexpensive is used as the material of the glass layer in the above preferred embodiment and Example, any other Si-containing organo-metallic compounds may be used as the material of the glass layer, and as far as the glass layer is formed as a continuous film, the material of the glass layer may be suitably selected.

In the above preferred embodiment and Example, acid or alkali is not added as a catalyst in the sol-gel process because CaS:Eu as the phosphor acts to shift the pH of the solvent to the alkaline region. However, acid or alkali (e.g., hydrochloric acid or ammonia) may be added as necessary according to the kind of the phosphor, for example, in preparing the light emitting composition.

Further, while CaS:Eu is used as the phosphor in Example mentioned above, any other alkaline earth metal sulfides such as $(Ca_xSr_{1-x})S:Eu$ ($0 \leq x \leq 1$) and $(Ba_x, Sr_y, Ca_{(1-x-y)})Ga_2S_4$:Eu ($0 \leq x, y \leq 1, x+y<1$) may be used.

Further, the kind of the phosphor itself is not limited to such thiogallates or alkaline earth metal sulfides. That is, as far as the phosphor itself is insufficient in moisture resistance, the light emitting composition configured by coating the phosphor with the continuous glass layer is effective to suppress deterioration in characteristics of the phosphor.

In addition, the type of the display device is not limited to that mentioned above, but any other types such as an edge light type may be adopted. Thus, various changes and modifications may be made.

While the invention has been described with reference to specific embodiments, the description is illustrative and is not to be construed as limiting the scope of the invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A light emitting composition prepared using a sol-gel process, the light emitting composition comprising: a phosphor in the form of particles; and a plurality of glass layers, each one of the glass layers substantially coating the surface of a respective one of the phosphor particles and containing at least silicon and oxygen; wherein each glass layer is formed about the respective phosphor particle and includes openings that define exposed regions of said respective phosphor particle, the exposed regions are made discrete from one another by the glass layer.

2. The light emitting composition according to claim 1, wherein the average thickness of said glass layer is 20 nm or more.

3. The light emitting composition according to claim 1, wherein said phosphor contains an alkaline earth metal sulfide.

4. The light emitting composition according to claim 1, wherein said phosphor is excited by blue light.

5. A light source device comprising: a first light emitting composition; a second light emitting composition; and a blue light source; wherein at least one of said first light emitting composition and said second light emitting composition is prepared using a sol-gel process and has a phosphor in the form of particles to be excited by blue light emitted from said blue light source; and wherein the surfaces of each of said phosphor particles are substantially coated with a respective glass layer containing at least silicon and oxygen, each of the glass layers formed about the respective phosphor particles and including openings that define exposed regions of said respective phosphor particles, the exposed regions being made discrete from one another by said glass layer.

6. The light source device according to claim 5, wherein said first light emitting composition has a first phosphor to be excited by blue light emitted from said blue light source; and said second light emitting composition has a second phosphor to be excited by blue light emitted from said blue light source.

7. A display device comprising: a light source device having a first light emitting composition, a second light emitting composition, and a blue light source; and an optical device for performing predetermined modulation to light emitted from said light source device to thereby output predetermined light; wherein at least one of said first light emitting composition and said second light emitting composition is prepared using a sol-gel process and has a phosphor in the form of particles to be excited by blue light emitted from said blue light source; and the surfaces of each of said phosphor particles are substantially coated with a respective glass layer containing at least silicon and oxygen, each glass layer formed about the respective phosphor particles including openings that define exposed regions of said respective phosphor particles, the exposed regions being made discrete from one another by the glass layer.

8. The display device according to claim 7, wherein said first light emitting composition has a first phosphor for emitting light in a green region, and said second light emitting composition has a second phosphor for emitting light in a red region.

9. A method of producing a light emitting composition including a phosphor in the form of particles, the method comprising: dispersing the phosphor in ethanol, tetraethyoxysilane and water to form a mixture; heating and stirring the mixture for a determined period of time; filtering the mixture to produce a residue, and drying the residue, wherein each of the phosphor particles in the resulting residue includes a respective glass layer substantially coating the surface of the respective phosphor particle and containing at least silicon and oxygen, and wherein each glass layer formed about the respective phosphor particle includes openings that define exposed regions of the respective phosphor particle, the exposed regions are made discrete from one another by the glass layer.

10. The method according to claim 9, wherein the phosphor is in particulate form, and a thickness of the glass layer ranges from about 20 nm to less than about an average diameter of the phosphor particles.

11. The method according to claim 9, wherein the proportion of water is four times the number of moles of tetraethyoxysilane.

* * * * *